April 5, 1960 J. S. FREISMUTH 2,931,576
THERMAL VALVE FOR COOLING SYSTEM
Filed Nov. 28, 1956
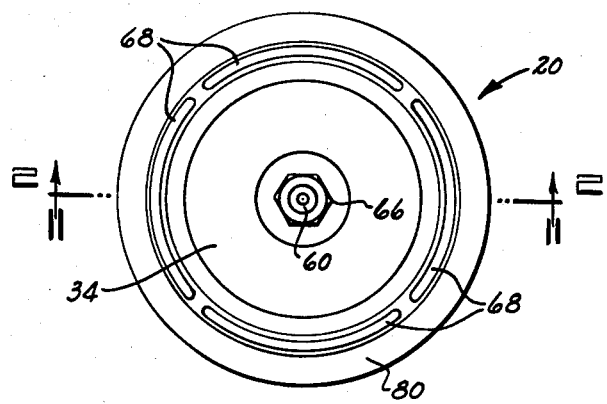
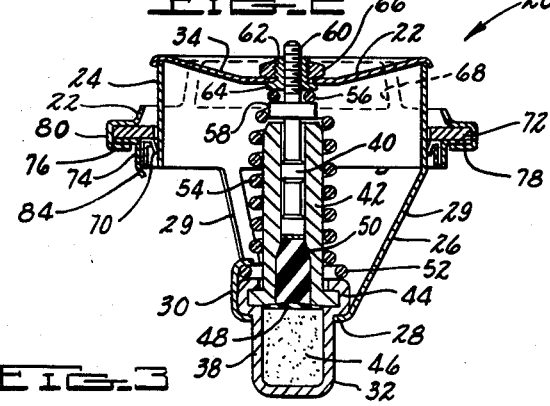
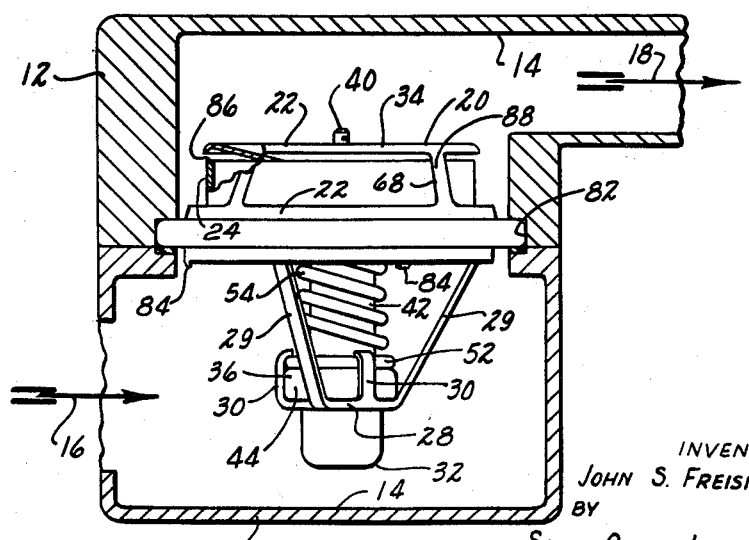
INVENTOR
JOHN S. FREISMUTH
BY
SMITH, OLSEN, LEWIS & McRAE
ATTORNEYS 2,931,576
Patented Apr. 5, 1960

2,931,576
THERMAL VALVE FOR COOLING SYSTEM

John S. Freismuth, St. Clair Shores, Mich., assignor, by mesne assignments, to American Radiator & Standard Sanitary Corporation, New York, N.Y., a corporation of Delaware Application November 28, 1956, Serial No. 624,900

3 Claims. (Cl. 236—34)

This invention relates to a thermostat, useful for example in the cooling system of an internal combustion engine.

Objects of the invention are, singly and collectively, to provide a thermostat wherein:

(1) The fluid pressures act at right angles to the "return mechanism" (which is necessary to close the thermostat against fluid flow); thereby enabling the use of a relatively low strength return mechanism, together with weaker but lower cost thermostat materials.

(2) The port-closing element of the thermostat moves at right angles to the direction of fluid flow so as to operate uninfluenced by and independent of fluid pressure variations or pressure differences as might be caused by different operating conditions.

(3) The thermostat is of such design as to be quickly responsive to fluid temperature changes.

(4) The thermostat is of such design as to be free of such frictional forces as might interfere with its successful operation.

(5) The above objects are achieved in a construction having no pockets, crevices or the like which could cause a build-up of rust, scale or corrosion.

Other objects of this invention will appear in the following description and appended claims, reference being had to the accompanying drawings forming a part of this specification wherein like reference characters designate corresponding parts in the several views.

In the drawings:

Fig. 1 is a top plan view of a thermostat embodying the invention.

Fig. 2 is a sectional view on line 2—2 in Fig. 1.

Fig. 3 is an elevational view taken in the same direction as Fig. 2, but showing the Fig. 1 embodiment installed in the coolant passage system of an engine cooling system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown in Fig. 3 a portion of an engine cooling jacket 10 having suitably bolted thereto a fitting 12 so as to define a fluid passage 14 for the flow of engine coolant in the direction of arrows 16 and 18.

The flow of coolant is controlled by a thermostat 20, which includes a cup member 22 fixedly mounted in passage 14 at the interface between members 10 and 12. Telescoped within cup member 22 is a tubular element 24, and integrally formed with element 24 is an apertured wall means 26. Wall means 26 includes an annular wall 28, and three spokes 29 extending from wall 28 to the lower end of tubular element 24. Wall means 26 also includes three spaced arms 30 (only two of which are visible in the drawings) extending from wall 28. Wall 28 serves to seat a thermally-operated power means 32 in position for moving tubular element 24 downwardly away from end wall 34 of fixed cup members 22 when the temperature of fluid in jacket 10 rises above a predetermined temperature.

Power means 32 includes a metal container 36 comprised of a cup 38, piston 40, and piston guide 42. An annular clamping ring 44 is provided for retaining cup 38 and piston guide 42 in their assembled positions. Clamping ring 44 may be integral with cup 38 or guide 42, or it may be formed separately therefrom as shown in Fig. 7 of U.S. Patent No. 2,636,776.

There is contained within cup 38 a pellet of thermally expansible material 46 which may be any of several materials, depending on the desired operating characteristics of the thermostat. As examples, material 46 may be paraffin or the material disclosed in U.S. Patent No. 2,259,846.

Material 46 is isolated from piston 40 by means of an elastic diaphragm 48 and deformable plug 50, preferably constructed as shown in U.S. Patent No. 2,636,776.

Arms 30 extend upwardly alongside of ring 44 and over into clamping engagement with the lowermost convolution 52 of a tension coil spring 54. The uppermost convolution 56 of spring 54 is seated on a shoulder 58 formed as an integral part of piston 40. The upper end 60 of piston 40 is threaded for reception of an internally threaded sleeve 62 which is provided with a collar 64 for abutting against the upstream face of end wall 34. A nut 66 retains the piston-sleeve assembly in fixed position relative to cup 22.

Cup 22 is provided with four openings 68 for the passage of fluid when element 24 is in its Fig. 3 position. In order to prevent passage of fluid when element 24 is in its Fig. 2 closed position there is provided an annular sealing element 70 which is seated against an annular reinforcement ring 72 and an annular retainer ring 74. Ring 74 is of L-shaped cross section. Leg 76 of ring 74 and the outer portion of ring 72 are seated within groove 78 formed by an extension 80 of the cup member 22 side wall. Extension 80 is adapted to seat in a recess 82 in fitting 12 whereby to mount cup member 22 in its Fig. 3 position. Inwardly bent walls 84 are extended from ring 74 to retain sealing element 70 in position against ring 72 while still permitting easy disassembly for replacement purposes.

In operation of the illustrated device, when the fluid in jacket 10 is at a relatively low temperature tension spring 54 is effective to draw tubular element 24 upwardly into contact with the upstream face of wall 34 so as to prevent passage of fluid through the thermostat. When the temperature of the fluid in jacket 10 increases to a point within the expansion range of material 46 guide 42 and cup 38 are forced downwardly as a unit (by expansion of material 46) against the action of spring 54; as a result tubular element 24 moves downwardly away from wall 34 so as to permit fluid from jacket 10 to flow through openings 68.

It will be noted that element 24 moves at right angles to the fluid as said fluid passes toward openings 68. As a result the only fluid force tending to prevent element 24 from closing against wall 34 is that fluid force which is directed against edge 86. Due to the relatively small area of edge 86 the fluid force thereon is relatively small; consequently spring 54 can be of relatively light construction and still perform the function of returning element 24 to its Fig. 2 position on fluid temperature decrease.

A relatively light spring construction is advantageous in that it enables the component parts of the thermostat to be constructed of relatively low-strength, low-cost materials. In this connection it will be understood that spring 54 works against the "expansive" action of material 46; therefore if spring 54 were of relatively stiff construction the side walls of container 36 would necessarily have to be relatively thick in order to withstand the forces developed by the "opposed working" action of the spring and material 46.

One advantage of the aforementioned "low opening force on wall 24" feature is that element 24 can thereby move very quickly in response to fluid temperature decrease, it being appreciated that the fluid pressure is not effective to control the position of element 24. In many prior art thermostats the fluid pressures tend to prevent quick closing of the thermostat when the fluid temperature decreases. With the present construction the thermostat operation is independent of fluid pressure variations such as might occur throughout portions of the operating cycle or as might occur in different installations.

It will be noted that side wall 88 of cup member 22 diverges in a direction away from wall 34. As a result of this construction there is no "pocket" between element 24 and wall 88 such as might trap fluid in a manner to cause a build-up of rust, scale or corrosion. Also, the "divergent" nature of wall 88 eliminates frictional drag and tends to have a "centering" action on element 24, whereby said element is caused to seat evenly at the desired points on wall 34 so as to prevent leakage past the joint between edge 86 and wall 34 in the closed position.

I claim:

1. In a fluid system, wall means forming a fluid passage; a cup member fixedly mounted in said passage with its mouth upstream from its end wall and with its end wall imperforate in a manner preventing substantial fluid flow therethrough; at least one fluid flow opening in the side wall of said cup member; a tubular valve element telescoped within said cup member; a mounting ring formed integrally with the mouth-forming portion of the cup member side wall and contoured to define an annular groove; a reinforcement ring seated in said groove; a ring of L-shaped cross section having one leg thereof seated in said groove; an annular sealing element seated against the other leg of said L-shaped ring and sealingly engaging the tubular element; wall means bent angularly from said other leg to retain the sealing element in position; an annular wall spaced upstream from said tubular element; spokes integrally connecting the tubular valve element and annular wall; a variable volume container immovably positioned on said annular wall; a piston slidably extending from said container into fixed connection with the cup member end wall; material within said container which substantially changes its volumetric displacement in response to temperature change; and a tension spring having its opposite ends anchored to the piston-end wall assembly and container, respectively.

2. In a fluid system defining a fluid passageway, the combination comprising a cup member mounted within the passageway with its mouth upstream from its end wall and with its end wall imperforate in a manner preventing substantial fluid flow therethrough; at least one fluid opening in the side wall of said cup member, with said side wall being spaced from the adjacent passageway surface to permit fluid to flow in the space therebetween; a tubular valve element telescoped within said cup member; an annular wall spaced upstream from said tubular element; spokes integrally connecting the valve element and annular wall; a variable volume container having a portion thereof positioned on said annular wall; a piston slidably extending from said container into fixed connection with the cup member end wall; thermally expansible material within said container; and a tension spring having its opposite ends carried by the piston-end wall assembly and container-annular wall assembly, respectively; and arm means formed integrally with said annular wall and extending axially along the peripheral surface of said container portion and radially across a spring convolution to anchor the spring to the container-annular wall assembly.

3. In a fluid system, wall means forming a fluid passage; a cup member fixedly mounted in said passage with its mouth upstream from its end wall and with its end wall imperforate in a manner preventing substantial fluid flow therethrough; at least one fluid flow opening in the side wall of said cup member; a tubular valve element telescoped within said cup member for movement toward and away from the cup member end wall; support wall means positioned upstream from the tubular element; spoke means interconnecting the tubular element and support wall means; thermally-operated power means comprising a container portion defining an annular shoulder section seated on said support wall means and a receptacle section extending therethrough, thermally expansible material within said receptacle section, a piston guide portion extending from said container portion toward the cup member end wall, and a piston slidably positioned within the guide portion and connected with said cup member end wall; and a tension spring having its opposite ends anchored to the cup member end wall assembly and container-support wall means.

References Cited in the file of this patent

UNITED STATES PATENTS

| 1,639,299 | Kinnard | Aug. 16, 1927 |
| 2,620,133 | Obermaier | Dec. 2, 1952 |
| 2,754,062 | Von Wangenheim | July 10, 1956 |
| 2,797,873 | Woods | July 2, 1957 |
| 2,810,524 | Puster | Oct. 22, 1957 |

FOREIGN PATENTS

| 662,977 | Germany | July 26, 1938 |